G. W. McGILL.

Pencils.

No. 166,934. Patented Aug. 24, 1875.

WITNESSES:
Gustave Dieterich
M. L. McGill

INVENTOR:
George W. McGill

G. W. McGILL.
Pencils.
No. 166,934. Patented Aug. 24, 1875.
2 Sheets--Sheet 2.
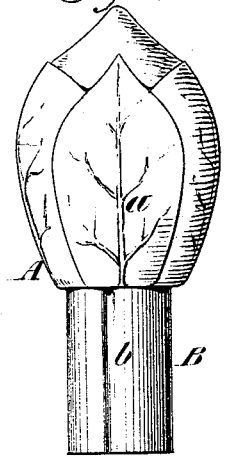
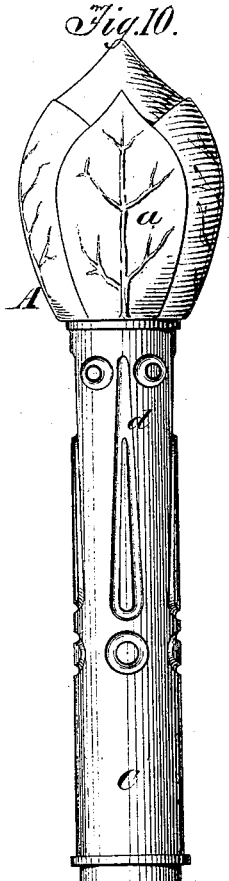
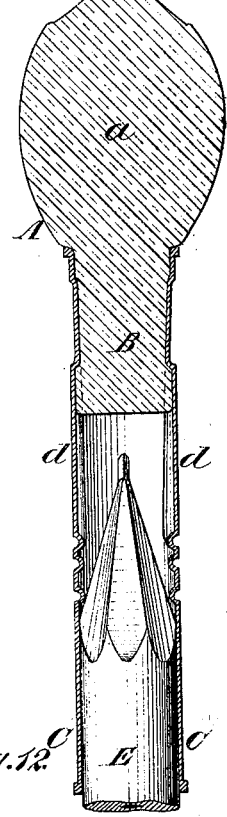
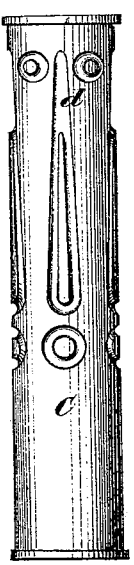
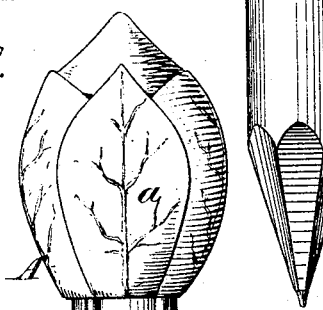
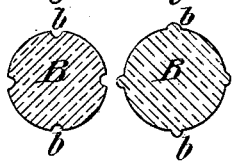
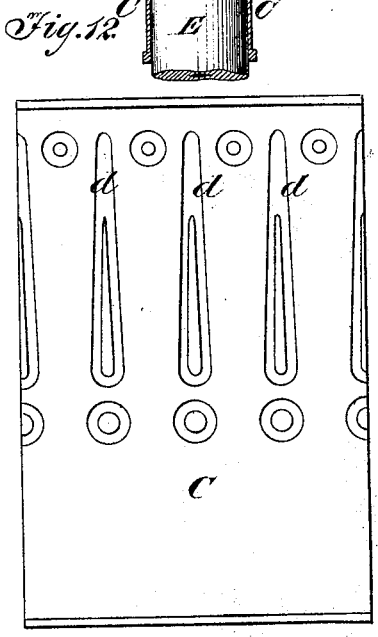

UNITED STATES PATENT OFFICE.

GEORGE W. McGILL, OF NEW YORK, N. Y.

IMPROVEMENT IN PENCILS.

Specification forming part of Letters Patent No. 166,934, dated August 24, 1875; application filed May 24, 1875.

CASE B.

*To all whom it may concern:*

Be it known that I, GEORGE W. MCGILL, of New York city, in the county and State of New York, have invented a certain new and useful Attachment for Pencils, of which the following is a specification:

The object of my invention is to provide a cheap, simple, and efficient means of securely holding a rubber eraser, and attaching the same to a lead-pencil in such manner that it may be used upon the head of the pencil for erasing, or removed therefrom and placed upon the point thereof, to protect the same when not in use; and it consists of a solid rubber erasive tip, molded so as to have a cylindrical shank of a diameter similar to that of an ordinary lead-pencil, having its cylindrical surface fluted or grooved lengthwise, and an enlarged and ornamented head, and of a metallic cylindrical tubular holder having its upper portion fluted and grooved to correspond with the flutings molded on the shank of the rubber tip, for the purpose of holding the same firmly, and to prevent its turning therein while being used, and sunken ornamentations, or an annular or spiral groove, rolled in its lower portion to lessen its diameter, for the purpose of clamping or holding the end of a pencil while inserted therein.

Figure 1:
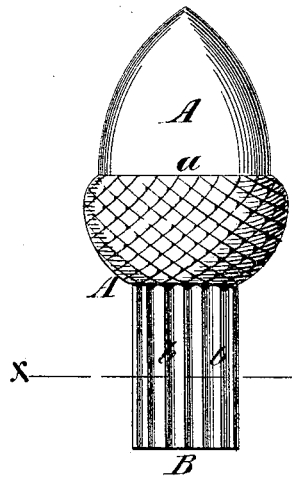
Figure 2:
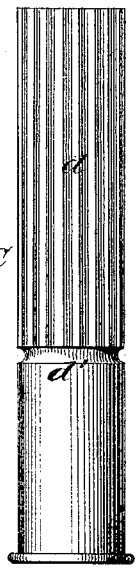
Figure 3:
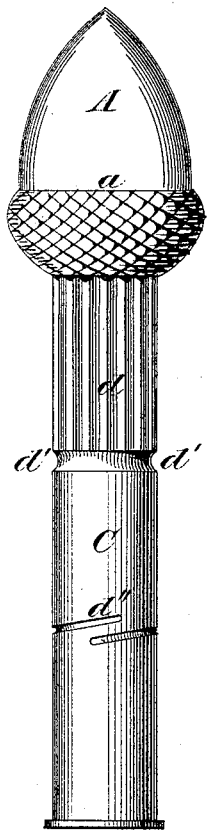
Figure 4:
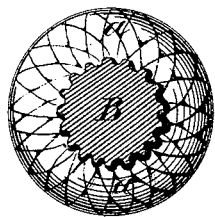

Figure 1 is a view of my rubber tip. Fig. 2 is a view of its metallic holder. Fig. 3 is a view of the rubber tip inserted in its holder as intended. Fig. 4 is a sectional view of the shank of the rubber tip, taken on the line $x\ x$ of Fig. 1. Figs. 5 and 6 are detail views of the rubber tip. Figs. 7 and 8 are detail sectional views of the shank of the tip. Fig. 9 is a detail view of the metallic holder. Fig. 10 is a view of my invention applied to a pencil in position to be used for erasing purposes. Fig. 11 is a sectional view of the same in use as a pencil-point protector; and Fig. 12 is a detail plan of the metallic holder, showing its grooves or corrugations for holding the rubber tip and clamping the pencil.

A is the erasive rubber tip, having an enlarged head, $a$, and a cylindrical shank, B, provided with grooves or flutings $b$. C is a metal cylindrical holding-tube, having the grooves or flutings $d$ rolled in its upper portion, and a sunken spiral groove, $d''$, rolled in its lower portion. E is a lead-pencil of usual construction. The rubber tip A is inserted in the holder C in such manner that their grooves or flutings will fit into each other, and the device placed on the end of a pencil, as shown in the drawing. The enlarged head $a$ of the rubber tip will prevent its being forced too far into the holder while being used as an eraser and the flutings on its shank, in conjunction with those of the holder, will prevent it turning therein. The lower end of the flutings of the holder will bite or clamp the end of the pencil, and hold it firmly in the holder, and where the holder is provided with the sunken groove $d'$ or spiral $d''$, as shown in Fig. 3, it can be secured upon the pencil, and held thereby with greater firmness, though these latter features form no part of my present invention, and, moreover, are shown in a companion case.

Having thus fully described the nature, construction, and operation of my invention, what I claim as new, and desire to secure by Letters Patent, is—

1. The erasive head or tip for pencils, having longitudinal projections or grooves formed in its base, to adapt it to be inserted and retained in a metal holder having a corresponding conformation, substantially as described.

2. The metallic tubular holder, provided with longitudinal projections or grooves, whereby it is adapted to receive and hold a rubber erasive head, substantially as described.

GEORGE W. McGILL.

Witnesses:
JOHN W. McGILL,
M. L. McGILL.